Patented Jan. 18, 1949

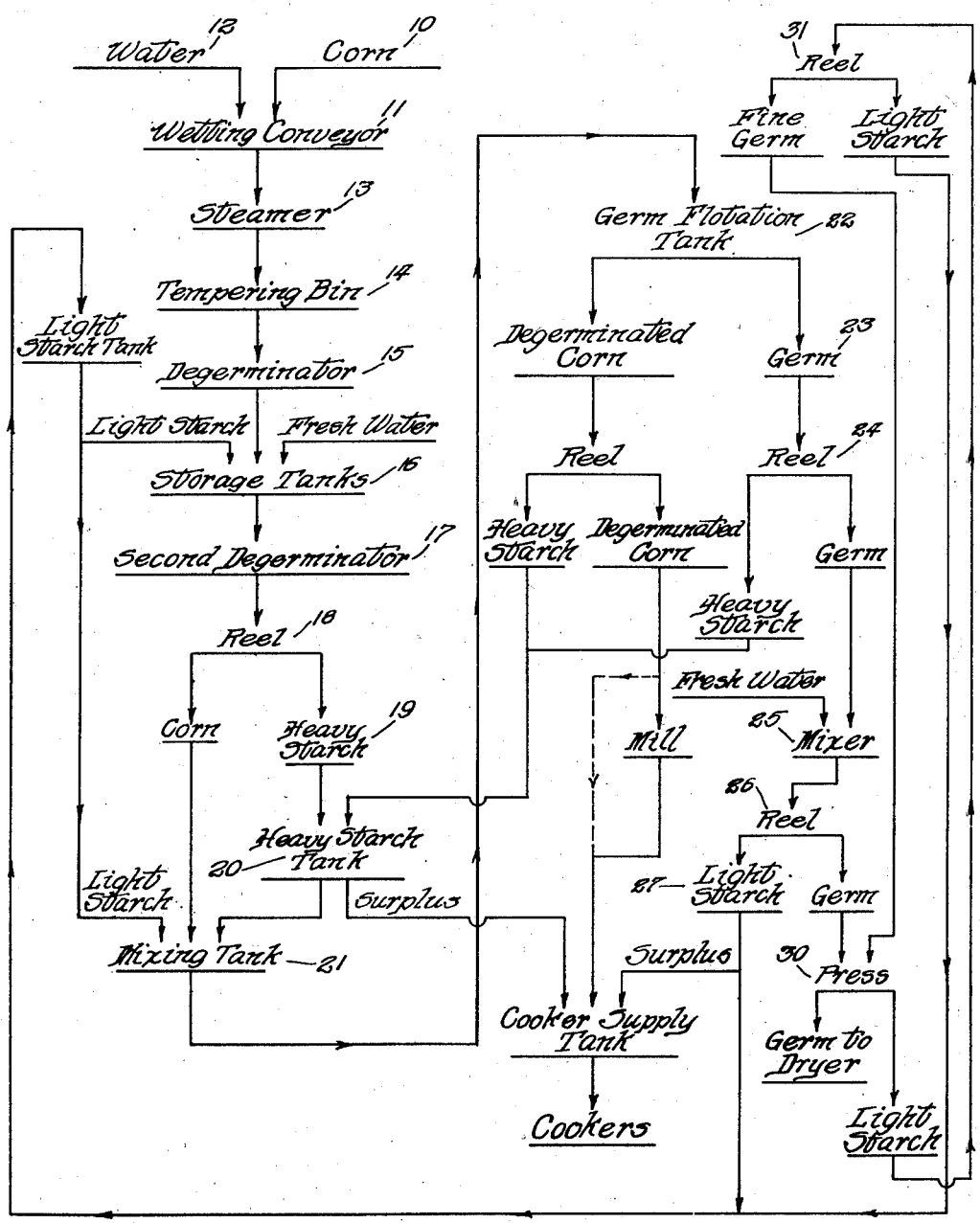

2,459,548

UNITED STATES PATENT OFFICE 2,459,548

CORN GERM REMOVAL

Philip A. Singer and Harold J. Deobald, Peoria, Ill., assignors to Allied Mills, Inc., a corporation of Indiana Application December 6, 1944, Serial No. 566,852

6 Claims. (Cl. 127—67)

This invention relates to a new and improved method for obtaining a separation of a relatively pure corn germ from corn, and to the products obtained thereby.

In the production of starch from corn the method commonly used to remove the germ, called a wet flotation or degermination system, consists in steeping the corn in a sulfurous acid solution then freeing the germ by rough grinding and finally floating off the germ on a starch milk of suitable specific gravity.

The fermentation and breakfast food industries commonly degerminate corn by a dry degerminating process where the corn is wetted, steamed, roughly ground and then dried. The germ in a relatively crude form may then be separated following a series of flaking operations in roller mills by subsequent reeling and aspirating.

In the brewing industry meal produced from corn by the dry degerminating process is employed in very large quantities for the brewing of beer and ale.

In the production of malt extracts and maltose sugar syrups large quantities of meal produced from dry degerminated corn are also used.

In each of the above last two mentioned processes a corn mash or milk from which the germ has been removed by flotation could be used to far better advantage than meal produced from degerminated corn by the dry process since the meal is mixed with large quantities of water before entering the cooking and conversion processes which are common to both industries.

Both of the above described germ separation or recovery methods have many inherent disadvantages. By the wet process when the acid steep is used 40 to 50 hours are necessary to obtain the desired softening of the kernel and the steeping acid brings into solution as high as 5% more materials which would not ordinarily be soluble in water, and, therefore, constitutes a considerable loss due to either extra recovery expense or actual waste of the dissolved materials. In addition the added cost of an acid generator, raw materials for the manufacture of sulfurous acid, and the additional equipment necessary to handle the acid solution all add to the production and maintenance cost.

The dry degermination process is extremely inefficient in that it is necessary to redry previously wetted material which must again be mixed with water in subsequent processes. The long series of rolls, mills, reels and aspirators used involve great maintenance costs, power consumption and labor. The principal disadvantage of this dry degerminating process is the poor yield of oil obtainable by this method.

The present invention provides a process for separating the corn germ which produces yields as high as or higher than the wet or flotation method, but eliminates the necessity for long acid steeping as well as the long series of milling and reeling operations involved in the dry degermination process.

In carrying out the present process the corn is first supplied with sufficient moisture to soften the whole grain, and cause the germ to become tough and pliable so that cracking and breaking of the germ will be resisted in the subsequent operations. Under normal circumstances, this requires sufficient moisture to produce a total moisture content of approximately 20% in the grain. This moisture may be supplied while the corn is on a suitable conveyor and is followed by blowing steam directly upon the wetted corn. This latter operation may be carried on in a typical grain steamer. More moisture may be added, provided the grain does not become soggy. Ordinarily not more than 30% need be added. A moisture content of 25-28% is preferred. Corn with a moisture content within this range forms a starch milk with greater ease in the later phases of the operation.

The heated wet corn, generally at a temperature of about 180° F., is allowed to stand in tempering bins for a short period, generally from 2 to 4 hours, in order to distribute the moisture through the grain.

The moist corn, while still somewhat warm, is then cracked by rough grinding or threshing in order to loosen the toughened germ from the remainder of the corn mass. To this coarsely ground or threshed corn a limited amount of water and/or thin starch is added, preferably to bring the total moisture content to approximately 65–75% of the total material present. The mix is stirred slowly for 2 to 4 hours to allow partial penetration of the added water and thereafter is threshed or violently stirred in order to free the germ. In the dry degermination process the grain is carefully cracked, as distinguished from crushing, in order that the particles may remain as large as possible. This distinction is not important in the present process and is one of the great advantages of it.

The violent agitation not only loosens the germ but also produces a starch milk of sufficient specific gravity to cause easy and clean flotation of the germ. Preferably the amount of moisture is adjusted to produce a starch milk having about 20% of solids and best results are obtained by maintaining a continuous process in which sufficient of this starch milk is recirculated to provide enough starch milk of approximately 20% solids for the proper flotation of the germ. The solids contained in the corn are not all starch milk yielded solids, which explains the difference between the 25–35% solids and the starch milk solids content of 20%.

Flotation of the germ may be accomplished in the same manner as that commonly used in the starch industry, but the germ so obtained differs from prior commercial corn germs in that it is practically free from hulls, and is substantially unbroken. It contains less starch than is usually found in the germ obtained by the dry process, and more starch than is customarily obtained by the wet process. The amount of oil is higher than that obtained by the wet process and very much higher than that obtained by the dry process.

The corn mass which settles away from the germ during the flotation step may be ground to reduce the large particles, after which the excess starch milk is added to the mass. This mixture provides an ideal base for use in fermentation, the brewing of beer, the manufacture of malt extract or maltose sugar syrups by the conventional cooking and mashing methods.

Where it is desired to manufacture starch, the settlings are ground, washed free of starch and gluten, which are separated by known methods, and the resulting bran dried as such or mixed with concentrated table gluten and then dried to make gluten feed.

It is an important part of the present process that the germ is not subjected to an excess of water for a period long enough for it to become soggy. The germ is permitted to be softened by the first addition of moisture so that it becomes tough and pliable and is not easily broken. The second addition of water is sufficient in quantity to render the germ soggy if continued for a long enough time, but the exposure to this second moistening is sufficiently short that the germ does not become saturated. The germ resists saturation because of the large amount of oil it contains, which is greater in the present process than in the other processes. As a result it separates more quickly and completely and, even where broken, the smaller broken pieces of germ rise, whereas in the ordinary floation process they are generally lost because their specific gravity has become relatively high. In the present process of yield of approximately 3.6 lbs. of germ per bushel of commercial corn may be obtained. This germ contains normally over 42% of oil and a typical analysis of germ obtained by this process, after drying, is as follows:

|  | Per cent |
|---|---|
| Oil | 42.18 |
| Protein | 18.66 |
| Fibre | 4.57 |
| Moisture | 2.64 |
| Starch | 15.00 |

The use of sulfurous acid is unnecessary in the present process because the contact of corn and water is limited in time and because the cracking of the corn followed by threshing liberates the germ and produces a desired quantity of starch milk. Because of the shortness of time there is no opportunity for deterioration, even without the sulfurous acid. The elimination of the corrosive sulfurous acid greatly reduces the cost of equipment maintenance as well as eliminating the need for acid generators. Moreover, the use of acid removes approximately 5% by weight of the corn into the solution and this solution does not occur in the present process.

This process, therefore, incorporates the favorable factors of both of the commonly used methods for germ separation in a new and novel process by which a maximum yield of relatively pure germ is obtained using a minimum amount of equipment and having low operating and maintenance costs. The labor requirements for the operation of the equipment involved in our new process are very much lower than are common in the conventional dry degerminating process.

The drawing consists of a diagrammatic flow sheet illustrating the preferred process. Corn 10 which has been thoroughly cleaned is weighed into the process through a dump type scale, and is thence taken to a hopper from which the grain is fed into a wetting conveyor 11, through any standard grain feeder. The wetting conveyor should be considerably oversize and equipped with ribbon on cut flights so as to retain a volume prior to discharge into the steamer equal to 5 to 10 minutes of plant capacity. Water 12 is added into the wetting conveyor at the discharge of the feeder conveyor in an amount sufficient to increase the moisture content of the corn up to 20% or more. Since the drying cracking process is followed by a wet process, the upper limit on the amount of water added is primarily determined by the nature of the grinding operation and the necessity of keeping the germ in a tough and pliable condition, and not too wet to enable it to be separated by flotation.

From the wetting conveyor the wetted corn is discharged into a typical grain steamer 13 where steam is circulated through and around the corn to increase its temperature to about 180° F.

From the steamer the corn is discharged into tempering bins 14, two of which should be provided for each degenerator 15, and the total capacity of the bin should be equivalent to about 4 hours of grind. In the case of new or high moisture corn the storage period in the bins may be as little as 2 hours, but in the case of old corn, containing say 11% to 12% moisture, a longer storage period may be necessary. The use of alternate bins permits more definite control of the storage period, since with a single bin channeling is likely to occur so that some corn will pass through without having been tempered sufficiently.

After leaving the tempering bins the corn may again be steamed, particularly where extremely dry corn has been used. After this second steaming, if it is used, or if it is not, directly from the tempering bins, the corn is fed to a degerminator. This machine may be a standard design horizontal or vertical plate type. In the degerminator the corn is cracked sufficiently to loosen the germ. From the degerminator the corn is discharged into a transit storage tank 16, having capacity sufficient for at least 2 hours of grind plus a sufficient volume of water or thin starch to bring the moisture content up to approximately 70%.

From this tank the material is fed continuously into a beater type of mill 17 which completely frees the corn germ from adhering particles of grain and bran and also frees a sufficient quantity of the corn starch of the corn proper to provide a milk in sufficient volume and of a sufficient specific gravity to effect the flotation step following. In order to accomplish proper process control, the mass leaving this second degerminator is run through reels 18 for the removal of the contained starch milk 19. This milk is run into the heavy starch storage tank 20 as indicated in the flow sheet, whereas the corn discharged by the reel is run into a mixing tank 21 where a sufficient volume of accumulated heavy starch plus, in some cases, some light starch is added to constitute a mixture of proper composition for effecting flotation.

The volume of the mixture at this stage is approximately 60 to 70 gallons per bushel of ground corn. The prepared mix is fed into a mixer box or tank located directly above the germ separator. It is desirable to regulate feed to the separator by means of the mixer. This may be accomplished by discharging into the separator by way of a feeder box the overflow from which is over an adjustable board so that uniform distribution at the surface of and for the full width of the separator is obtained.

The germ separator or flotation tank 22 is of typical design equipped with a paddle scraping device for the removal of the germ. The corn mass including bran, which is of greater specific gravity than the starch, settles out and is continuously discharged at the bottom or close to the bottom of the separator. This corn mass is conveyed the length of the separator through a series of pitched paddles which are mounted on a horizontal shaft. These pitched paddles are radially so mounted on the shaft as to provide what amounts to 1½ conveyor flights in the length of the separator.

The germ which floats on the surface of the starch milk in the separator is continuously removed over a weir which is maintained level. The germ 23 is of course accompanied by a large volume of starch milk and is, therefore, run into reels 24 where the starch milk is separated and is piped to the heavy starch storage tank 20 as indicated in the flow sheet. The germ is then discharged into a mixer box 25 where fresh water is added and from which the germ-water mixture is fed into a second reel 26 wherein the thin starch 27 is separated and is recirculated for use either in the mixing tank 21 which supplies the germ separator or storage tanks taking the corn from the degerminator. In some instances it may be desirable to provide a light starch storage tank.

The germ leaving the reels is run into a moisture expeller of standard type. It is then pressed in press 30 and the pressed germ is fed continuously to germ dryers of any suitable form.

The light starch milk recovered from the press is preferably pumped to a reel 31 clothed with 40-mesh wire for the recovery of fine germ particles which may be washed out in the press. This reel is preferably located so that the germ discharged from it can spout directly back to the press 30. The light starch milk leaving this reel will go to the light starch supply tank and used in the same manner as light starch from the previous reel.

The degerminated corn leaving the bottom of the separator is discharged into the reel and the separated heavy starch is piped to the heavy starch supply tank. The degerminated corn leaving the reel discharges into a second beater type of mill in which a further reduction of the corn particle size is accomplished. This second mill is provided because in the case of extremely dry corn the particle size may otherwise be too large to accomplish satisfactory cooking. The second mill may be by-passed in the event that the particle size is already sufficiently small. The by-pass in the event that it is used, as well as the discharge from the mill, discharges into a cooker supply storage tank which also receives overflow from the heavy starch as well as the light starch tanks to provide an outlet of surplus of these materials. The mass is pumped from the cooker supply tank to a suitably designed weigh scale tank equipped with a knife-edge overflow which will overflow back to the cooker supply tank.

This scale tank should be calibrated by weighing it full of water at a temperature of 70–90° F. and each weighing thereafter can then be assumed to be a reasonably accurate specific gravity determination of the mass from which materials chargeable to a distillery process can be calculated.

This application is a continuation-in-part of our co-pending application Serial No. 492,572, filed June 28, 1943, now abandoned.

The foregoing detailed description has been given for clearness of understanding only, and no unnecessary limitations should be understood therefrom.

What we claim as new, and desire to secure by Letters Patent, is:

1. The method which comprises supplying only sufficient water to corn to bring the moisture content thereof to 20–30% by weight, maintaining the corn in the presence of the added moisture for a short period sufficient to distribute the moisture substantially uniformly through the corn, cracking the corn to loosen the germ, supplying additional moisture to the corn to form a starch liquid, violently agitating the corn in the presence of the added moisture to produce a starch liquid having a higher specific gravity than that of the corn germ, and separating the germ by flotation from the corn in the presence of said starch liquid.

2. The method which comprises supplying only sufficient water to corn to bring the moisture content thereof to 20–30% by weight, maintaining the corn in the presence of the added moisture for a short period sufficient to distribute the moisture substantially uniformly through the corn, cracking the corn to loosen the germ, supplying additional moisture to the corn to form a starch liquid having a higher specific gravity than that of the germ, crushing the corn into fine particles in the presence of the added moisture to produce said starch liquid having a higher specific gravity than that of the corn germ, then threshing the corn to free the germ and separating the germ from the corn in the presence of starch liquid having a higher specific gravity than the specific gravity of the germ.

3. The method as set forth in claim 1, in which the total moisture added to the corn in the two addition steps is approximately sufficient to produce a solid content of 25–35% in the mixture.

4. The method as set forth in claim 1, in which the separated germ is removed together with adhering starch liquid, the starch liquid separated therefrom, and is recycled and supplied as additional moisture to an additional quantity of corn.

5. The method which comprises supplying only sufficient water to corn to bring the moisture content thereof to 20–30% by weight heating the corn and maintaining the corn at an elevated temperature in the presence of the added moisture for a short period sufficient to distribute the moisture substantially uniformly throughout the corn, loosening the corn germ by a fracturing operation, supplying additional moisture to the corn to bring the solid content thereof down to 25-35% by weight, stirring the mixture slowly for a short time to allow penetration of the added water, freeing the germ by agitation in the presence of the added moisture whereby a starch milk of sufficient specific gravity to float the germ is produced, and separating the germ from the starch milk so produced.

6. The method as set forth in claim 5, in which the amount of solids in the starch milk is about 20% by weight during the separation by flotation of the germ.

PHILIP A. SINGER.
HAROLD J. DEOBALD.

REFERENCES CITED

The following references are of record in the file of this patent:

UNITED STATES PATENTS

| Number | Name | Date |
| --- | --- | --- |
| 302,198 | Gent | July 15, 1884 |
| 304,722 | Gent | Sept. 9, 1884 |
| 567,790 | O'Neill | Sept. 15, 1896 |
| 943,722 | Watkins | Dec. 21, 1909 |
| 1,554,301 | Sherman | Sept. 22, 1925 |
| 2,237,561 | King | Apr. 8, 1941 |
| 2,284,239 | Wagner | May 26, 1942 |
| 2,347,215 | Pattee | Apr. 25, 1944 |

FOREIGN PATENTS

| Number | Country | Date |
| --- | --- | --- |
| 18,237 | Great Britain | 1901 |